3,036,061
STEROIDS
Harold Belding MacPhillamy, Madison, and Robert Armistead Lucas, Mendham, N.J., assignors to Ciba Corporation, a corporation of Delaware
No Drawing. Filed Aug. 5, 1959, Ser. No. 831,693
11 Claims. (Cl. 260—210.5)

The present invention concerns glycosides of steroid compounds. More particularly, it relates to 20-amino-3β-hydroxyallopregnane 3-glycosides of the formula:

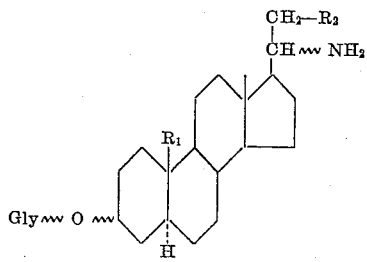

in which $R_1$ represents hydrogen or methyl, $R_2$ stands for hydrogen, hydroxyl or esterified hydroxyl, Gly represents the radical of a monosaccharide or a disaccharide, and the salts of such compounds.

Although $R_1$ may represent hydrogen, it preferably stands for methyl.

$R_2$ represents primarily hydrogen. A hydroxyl group may be esterified by organic carboxylic acids containing from one to twelve carbon atoms. Such acids may be represented by aliphatic carboxylic acids, such as alkanoic acid, e.g. formic, acetic, propionic, n-butyric, n-valeric, n-hexanoic, n-decanoic, lauric, trimethylacetic, isobutyric, isovaleric or tertiary butyl-acetic acid, alkenoic acids, e.g. acrylic, crotonic or undecylenic acid, alkynoic acids, e.g. propiolic, 2-butynoic or undecolic acid, cycloalkanoic acids, e.g. cyclohexane-carboxylic acid, cycloalkylalkanoic acids, e.g. cyclohexylacetic acid or β-cyclopentyl-propionic acid, aliphatic dicarboxylic acids (the free carboxyl group of which may then be converted into water-soluble alkali metal, e.g. sodium, salts), such as saturated aliphatic dicarboxylic acids, e.g. succinic or adipic acid, or unsaturated aliphatic dicarboxylic acids, e.g. maleic or citraconic acids, carbocyclic aryl carboxylic acids, e.g. benzoic acid, carbocyclic arylalkanoic acids, e.g. phenylacetic or β-phenyl-propionic acid, or carbocyclic arylalkenoic acids, e.g. cinnamic acid.

Gly, the residue of a saccharide, may be represented by the residue of a monosaccharide, such as, for example, an aldopentose, e.g. arabinose, xylose or ribose and the like, a deoxyaldohexose, e.g. rhamnose and the like, or an aldohexose, e.g. glucose, galactose, mannose, allose, altrose or gluose and the like, or by the residue of a disaccharide, e.g. maltose or lactose. These saccharide residues may be of the D- or L-form and may be α- or β-anomeric isomers.

The 3-hydroxyl group, as well as the amino group in the 20-position may have the α- or the β-configuration; the wavy lines in the formula indicate the two possibilities of configurational forms.

Salts are especially pharmacologically acceptable acid addition salts, such as those with inorganic acids, for example, mineral acids, e.g. hydrochloric, hydrobromic, sulfuric or phosphoric acid, or organic carboxylic acids, primarily aliphatic carboxylic acids, e.g. acetic, propionic, tartaric, citric, maleic, hydroxymaleic and the like.

The new glycosides of this invention and the salts thereof have antihypertensive effects and may be used as hypotensive agents to relieve states of high blood pressure, such as renal hypertension, and the like.

The compounds of this invention and the salts thereof may be prepared by reacting pregnane derivatives of the formula:

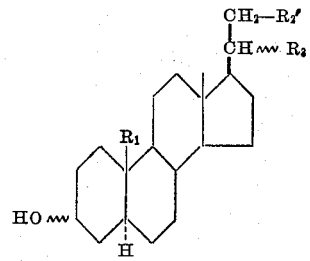

in which $R_1$ has the previously given meaning, $R_2'$ represents hydrogen or a functionally converted, particularly esterified, hydroxyl group, $R_3$ represents a temporarily protected amino group, with a reactive derivative of a monosaccharide or of a disaccharide, the hydroxyl groups of which are temporarily protected, and, if necessary, converting temporarily protected amino and/or hydroxyl groups into free amino and/or free hydroxyl groups, and/or, if desired, converting a resulting salt into the free base, and/or, if desired, converting a free base into a salt thereof.

The temporarily protected amino group $R_3$ may be an acylamino group, in which the acyl radical is easily hydrolyzable. Such an acyl radical may be, for example, derived from a strong aliphatic carboxylic acid, primarily a polyhalogenoacetic acid, e.g. trifluoroacetic or trichloroacetic acid. Other temporarily protected amino groups may be those, in which the protecting group(s) is(are) cleaved off by hydrogenolysis; such a protected amino group may be a benzyl-substituted amino group, e.g. dibenzylamino, or a carbobenzoxy-amino group.

A reactive derivative of a monosaccharide or disaccharide, in which the hydroxyl groups are temporarily protected, and which is capable of forming a glycoside linkage with the hydroxyl group substituting the carbon atom of position 3 of the pregnane compound, are particularly halogeno-monosaccharides or halogen-disaccharides, in which halogen stands for chlorine, or particularly bromine, and in which the free hydroxyl groups are acylated, for example, by lower alkanoic acids, particularly acetic acid. The reagents of choice are, for example, 1-bromo-monosaccharides or 1-bromo-disaccharides, in which the hydroxyl groups are esterified by lower alkanoic acids, especially acetic acid; such reagents are, for example, 1-bromo-tri-O-acetyl-aldopentose, e.g. 1 - bromo - tri-O-acetyl-arabinose, 1 - bromo-tri-O-acetyl-xylose or 1-bromo-tri-O-acetyl-ribose and the like, 1-bromo-tri-O-acetyl-deoxy-aldohexoses, e.g. 1 - bromo-tri-O-acetyl-rhamnose and the like, 1-bromo-tetra-O-acetyl-aldohexoses, e.g. 1-bromo-tetra-O-acetyl-glucose, 1-bromo-tetra-O-acetyl-galactose, 1-bromo-tetra-O-acetyl mannose, 1 -bromo - tetra-O-acetyl-allose, 1 - bromo-tetra-O-acetyl-altrose or 1-bromo-tetra-O-acetyl-gulose and the like, or 1 - bromo-hepta-O-acetyl-hexosido-aldohexoses, e.g. 1-bromo-hepta-O-acetyl-maltose or 1-bromo-hepta-O-acetyl-lactose and the like.

The reaction is carried out according to conditions used for the preparation of glycosides, for example, in the presence of a condensation reagent; such reagent may influence the configuration of the glycosyl residue. Thus, the presence of a basic condensation reagent, such as a basic silver compound, e.g. silver oxide or silver carbonate, or an organic tertiary base, such as a liquid heterocyclic tertiary base, e.g. pyridine, preferably used in an anhydrous medium, affords predominantly the formation of glycosides, in which the glycosyl residue has the β-configuration. In the presence of more acidic condensation reagents, such as, for example, mercuric acetate or ferric chloride, glycosides in which the glycosyl residue has the α-configuration prevail. Other factors, as the ratio of reactants to condensation reagent, reaction temperature, solvents, etc. may influence the configuration of the glycosyl residue.

Suitable solvents are inert organic solvents which are selected according to the solubilities of the reagents; halogenated aliphatic hydrocarbons, e.g. methylene chloride or chloroform, or carbocyclic aryl hydrocarbons, e.g. benzene or toluene, may be utilized. Silver oxide and silver carbonate are advantageously used in the presence of a dehydrating agent, such as calcium sulfate, and/or while azeotropically distilling part of the solvent, particularly a carbocyclic aryl hydrocarbon, to remove any trace of water. The reaction may be performed at room temperature or at an elevated temperature, and, if desired, in the atmosphere of an inert gas, e.g. nitrogen.

The starting materials used in the above reaction are known or, if new, may be prepared according to known procedures.

For example, by reducing the oxime of a 20-oxo-pregnane compound, the corresponding 20-amino derivatives may be prepared, in which the amino group may have the α- or β-configuration. If the reduction is carried out under acidic conditions, for example, by treatment with hydrogen in the presence of a catalyst containing a metal of the eighth group of the periodic system, e.g. platinum oxide, and an acid, such as a lower alkanoic acid, e.g. acetic acid, or by treatment of an acid, e.g. acetic acid, solution of the starting material with zinc, the 20α-amino derivative is formed. Any double bond present in the 5-position of the starting material may be hydrogenated simultaneously with the oxime, whenever the catalytic hydrogenation procedure is employed; such removal of the double bond yields the desired 5α-configuration (allo-configuration) of the hydrogen atom attached to that position.

If the reduction of the oxime is performed under alkaline conditions, for example, by treatment of a lower alkanol, e.g. methanol, ethanol, propanol or n-butanol, solution of the starting material with an alkali metal, e.g. sodium, or by treatment of the starting material with an alkali metal aluminum hydride, e.g. lithium aluminum hydride, in an inert solvent, the corresponding 20β-amino derivative is formed predominantly.

A 20α-amino-pregnane derivative may also be obtained by converting a carboxyl group in position 20 to the amino group. This may be carried out, for example, according to the Curtius procedure, which involves conversion of the carboxyl group into the carboxy chloride group, for example, by treatment with oxalyl chloride, reacting the resulting acid chloride with an azide, such as an alkali metal, e.g. sodium azide, and rearranging the acid azide compound to the desired 20α-amino-pregnane derivative by treatment with a lower alkanol, e.g. ethanol, and then with an acidic or an alkaline reagent; these reactions may be carried out according to known conditions.

The compounds of the present invention may also be prepared by converting in a 3-glycoside of a pregnane derivative of the formula:

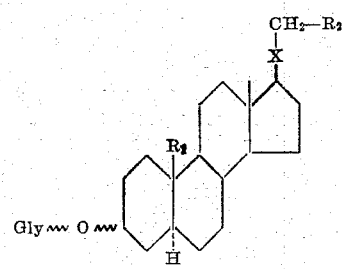

in which $R_1$, $R_2$ and Gly have the above-given meaning, whereby the hydroxyl groups of the glycosyl residue may temporarily be protected, for example, by acyl groups, and in which X represents a group capable of being converted into an amino-methylene group of the formula $$>CH-NH_2$$

or a salt thereof, the group X into the amino-methylene group of the formula $>CH-NH_2$, and, if necessary, converting temporarily protected hydroxyl groups into free hydroxyl groups, and, if desired, carrying out the optional steps.

A radical X capable of being converted to the amino-methylene group of the formula $>CH-NH_2$, may be, for example, a carbonyl group of the formula $>C=O$, or primarily an oximino-methylene group of the formula $>C=N-OH$. A carbonyl group may be converted into the latter by treatment with a mineral acid salt, e.g. sulfate, or primarily hydrochloride, of hydroxylamine in the presence of a base, such as an alkali metal lower alkanoate, e.g. sodium or potassium acetate, or a tertiary amine, such as, for example, a tri-lower alkyl amine, e.g. trimethylamine or triethylamine, or particularly a liquid heterocyclic tertiary base, e.g. pyridine or collidine; a lower alkanol, e.g. methanol or ethanol, may serve as a diluent, or the liquid tertiary amines, particularly pyridine, may simultaneously serve as a solvent.

The starting materials used for this modification of the process of the preparation, are, therefore, primarily compounds of the formula:

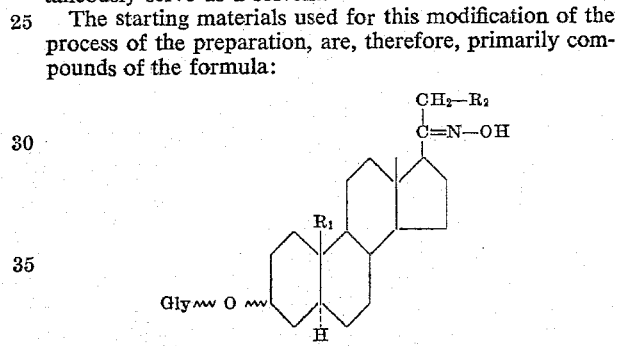

in which $R_1$, $R_2$ and Gly have the previously given meaning, whereby the hydroxyl groups of the glycosyl residue may temporarily be protected by acyl radicals of lower alkanoic acids, or acid addition salts thereof, particularly with mineral acids which may be converted to the desired 20-amino derivatives by reduction. The latter may be carried out according to the procedures previously outlined for the preparation of the starting materials of the alternate procedure described hereinbefore. Depending on the character of the reducing reagent and/or the medium present during the reduction, the resulting amino group may have either the α- or the β-configuration. For example, an acidic reducing reagent and/or an acidic medium furnishes primarily 20α-amino-pregnane derivatives, whereas an alkaline reducing reagent and/or an alkaline medium gives predominantly 20β-amino-pregnane derivatives.

The radical X may also represent a carboxy-methylene group of the formula $>CH-COOH$, which may be converted to the desired 20-amino-pregnane derivative, according to previously described procedures, particularly the Curtius reaction. Due to the fact that the carboxyl group, attached to the carbon atom of position 20, has predominantly the α-configuration, the resulting amino group will also have the α-configuration.

The starting materials used in this modification are known, or, if new, may be prepared according to procedures used for known compounds; for example, a hydroxyl group in position 3 may be glycosylated as previously shown in the alternative procedure for the preparation of the compounds of this invention.

Any temporarily protected amino and/or hydroxyl groups present after the formation of the glycoside bond or the amino group, respectively, are converted into free amino and/or hydroxyl groups. Acylamino groups, particularly polyhalogeno-lower alkanoylamino, e.g. trifluoroacetylamino or trichloroacetylamino, groups are hydrolyzed, for example, by treatment with an alkaline reagent, such as aqueous alkali metal hydroxide, e.g. lithium, sodium or potassium hydroxide. An aqueous acidic reagent, such as dilute hydrohalic acid, e.g. hydrochloric acid, may also be used; however, acid reagents may split the glycoside bond. An acyloxy, such as a lower alkanoyloxy, e.g. acetoxy, group present in the final product, is hydrolyzed with an alkaline reagent, such as, for example, an aqueous alkali metal hydroxide, e.g. lithium, sodium or potassium hydroxide. Acylamino and acyloxy groups may be hydrolized simultaneously, for example, by treatment with an aqueous alkali metal hydroxide.

A benzyl radical, such as, for example, present in a dibenzylamino group, or a carbobenzoxy group, such as, for example, present in a carbobenzoxyamino group, may be removed by hydrogenolysis under mild conditions, for example, by treatment with hydrogen under atmospheric pressure and in the presence of a catalyst containing a metal of the eighth group of the periodic system, e.g. palladium black.

The new glycosides of this invention may be obtained in the form of the free bases or as the salts thereof. A salt may be converted into the free base, for example, by reaction with an aqueous alkaline reagent, such as an alkaline metal hydroxide, e.g. lithium, sodium or potassium hydroxide, an alkali metal carbonate, e.g. lithium, sodium or potassium carbonate or hydrogen carbonate, or ammonia. A free base may be transformed into its therapeutically useful acid addition salts by reaction with an appropriate inorganic or organic acid, such as, the acids outlined above, for example, by treating a solution of the base in a lower alkanol, e.g. methanol or ethanol, with the acid or a solution thereof.

The new compounds of this invention may be used in the form of pharmaceutical compositions which contain the new 20-amino-3-hydroxy-5-allopregnane 3-glycosides or salts thereof together with a carrier. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in solid form, for example, as tablets, dragees or capsules, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, for example, other antihypertensive compounds, for example, Rauwolfia alkaloids, e.g. reserpine, rescinnamine or deserpidine, veratrum alkaloids, e.g. germine or protoveratrine, synthetic hypotensive compounds, e.g. hydralazine, or ganglionic blockers, e.g. chlorisondamine.

The following examples illustrate the invention and are not to be construed as being limitations thereon. Temperatures are given in degrees centigrade.

*Example 1*

A mixture of 1.73 g. of 3β-hydroxy-20α-trifluoroacetylamino-5-allopregnane, 3.46 g. of acetobromglucose, 3.46 g. of anhydrous calcium sulfate and 3.46 g. of freshly prepared silver oxide in 50 ml. of dry chloroform is stirred at room temperature for 24 hours. The solid material is filtered off, the filtrate is concentrated under reduced pressure and the solid material is recrystallized from aqueous ethanol, M.P. 218–220°. This represents predominantly the 3β-hydroxy-20α-trifluoroacetylamino-5-allopregnane 3-β-D-tetraacetyl-glucoside.

0.72 g. of 3β-hydroxy-20α-trifluoroacetylamino-5-allopregnane 3-β-D-tetracetyl-glucoside is refluxed in a solution of 1.5 g. of potassium hydroxide in 8 ml. of ethanol and 1.5 ml. of water for five hours. The solution is poured into water, the white crystalline material is filtered off, dissolved in hot ethanol containing about two drops of concentrated hydrochloric acid, and the solution is chilled. The crystalline 20α-amino-3β-hydroxy-5-allopregnane 3-β-D-glucoside hydrochloride precipitates and is recrystallized from ethanol, M.P. 250–252° (with decomposition); yield: 0.35 g.

The starting material in the above reaction may be prepared as follows: A solution of 3.65 g. of Δ⁵-20α-amino-3β-hydroxy-pregnane in 50 ml. of glacial acetic acid is treated with hydrogen under atmospheric pressure and in the presence of platinum oxide. Upon completion of the reduction the catalyst is filtered off, the filtrate is concentrated to dryness under reduced pressure and the residue dissolved in warm aqueous methanol, to which a small amount of 10 percent aqueous sodium hydroxide has been added. The 20α-amino-3β-hydroxy-5-allopregnane precipitates in white crystals and is recrystallized from a mixture of ethanol and water, M.P. 171–173°; yield: 2.55 g.

A solution of 2.05 g. of 20α-amino-3β-hydroxy-5-allopregnane in 15 ml. of dry pyridine is treated with 3.16 ml. of trifluoroacetic acid anhydride. After standing at room temperature for two hours the mixture is poured into 100 ml. of ice-water, and the resulting mixture is then extracted with ether. The ether solution is washed with dilute aqueous hydrochloric acid, and then with water. The organic layer is dried over sodium sulfate and concentrated to dryness under reduced pressure. The residue is dissolved in 200 ml. of 95 percent ethanol, a solution 7 g. of potassium hydrogen carbonate in 100 ml. of water is added and the mixture is allowed to stand at room temperature for two days. An additional amount of 200 ml. of water is added, and the aqueous mixture is extracted with ether; the organic layer is washed with water, dried over magnesium sulfate and then concentrated under reduced pressure. The resulting 3β-hydroxy-20α-trifluoroacetylamino-5-allopregnane is recrystallized from methanol, M.P. 214–215.5°; yield: 1.73 g.

Other monosaccharide or disaccharide derivatives, which may replace acetobromglucose in the above procedure are, for example, acetobromarabinose, acetobromxylose, acetobromribose, acetobromgalactose, acetobrommannose, acetobromrhamnose, or acetobrommaltose and the like; the corresponding 20α-amino-3β-hydroxy-5-allopregnane 3-glycosides, such as the 3-arabinoside, 3-xyloside, 3-riboside, 3-galactoside, 3-rhamnoside or 3-maltoside and the like.

*Example 2*

A mixture of 4.0 g. of 3β-hydroxy-20-oxo-5-allopregnane (dried under reduced pressure at 110° for 3 hours), 12.0 g. of crushed anhydrous calcium carbonate and 5.0 g. of silver oxide in 100 ml. of chloroform (freshly distilled from a mixture with phosphorus pentoxide) is stirred for fifteen minutes and 12.0 g. of acetobromlactose is added. The reaction mixture is stirred for two days at room temperature. After filtration of the insoluble material, the solution is evaporated to dryness under reduced pressure; a gummy precipitate is formed upon adding an excess of water to an ethanol solution of the residue, which is reprecipitated several times from the same solvent system to yield 7.5 g. of a white solid material, representing 3β-hydroxy-20-oxo-5-allopregnane 3-hepta-O-acetyl-lactoside, M.P. 110–120°.

A mixture of 3 g. of the above material and 0.6 g. of hydroxylamine hydrochloride in 30 ml. of pyridine is heated on the steam bath for one hour. After standing for sixty-four hours at room temperature the reaction mixture is again heated for three hours, allowed to stand at room temperature for an additional three hours and then poured into water. The resulting precipitate is filtered off and washed with water; it represents the 3β-hydroxy-20-oximino-5-allopregnane 3-hepta-O-acetyl-lactoside, M.P. 100–105°.

A solution of 2.82 g. of 3β-hydroxy-20-oximino-5-allopregnane 3-hepta-O-acetyl-lactoside in 30 ml. of acetic acid is treated with hydrogen at atmospheric pressure and in the presence of 0.75 g. of platinum oxide. The catalyst is filtered off, the filtrate is diluted with water and the pH adjusted to 8 by adding aqueous ammonia. The gray pasty solid is filtered off and suspended in ethanol; the solution is concentrated to a small volume. Ether is added and 0.5 g. of a white, insoluble powder is filtered off.

The mother liquor, when evaporated yields 2.15 g. of a foam, which is dissolved in 8 ml. of methanol. 0.04 ml. of an approximately 1 N barium methoxide solution is added and the reaction mixture is heated on the steam bath for ten minutes. After cooling and adjusted to pH=8 with solid carbon dioxide, 40 ml. of water and 40 ml. of ethyl acetate are added. The organic layer is dried over sodium sulfate and evaporated under reduced pressure. The resulting foam is dissolved in anhydrous ethanol and hydrochloric acid (1:1) is added to pH=1-2; the solution is concentrated in a nitrogen atmosphere, ether and a small amount of acetone are added and the resulting sticky solid material is collected. It is suspended in acetone, ether is added, the solid material is filtered off and washed with ether. 0.4 g. of the white powder, representing 20α-amino-3β-hydroxy-5-allopregnane 3-lactoside hydrochloride, is collected, M.P. 253–258°.

*Example 3*

To a solution of 10 g. of 3β-hydroxy-20-oxo-5-allopregnane in 260 ml. of hot, dry benzene are added 13.5 g. of acetobromglucose and 5.25 g. of mercuric acetate. The mixture is refluxed for five hours and then cooled; the benzene solution is washed with water, dried over sodium sulfate, and concentrated to dryness under reduced pressure. The residue is recrystallized from ethanol to yield 4.11 g. of 3β-hydroxy-20-oxo-5-allopregnane 3-α-D-tetra-O-acetyl-glucoside, M.P. 205–207°.

A solution of 3.58 g. of 3β-hydroxy-20-oxo-5-allopregnane 3-α-D-tetra-O-acetyl-glucoside in 36 ml. of dry pyridine is heated on the steam bath for five hours in the presence of 0.813 g. of hydroxylamine hydrochloride. The reaction mixture is cooled, poured into a mixture of ice and water, and then filtered. The white solid is recrystallized from methanol, M.P. 212°–214°, representing the 3β-hydroxy-20-oximino-5-allopregnane 3-α-D-tetra-O-acetyl-glucoside.

2.19 g. of 3β-hydroxy-20-oximino-5-allopregnane 3-α-D-tetra-O-acetyl-glucoside is dissolved in 20 ml. of glacial acetic acid and treated with hydrogen at atmospheric pressure and in the presence of 0.55 g. of platinum oxide. The catalyst is filtered off, the filtrate is concentrated to dryness under reduced pressure, and the residue is hydrolyzed by refluxing for two hours in a mixture of 25 ml. of ethanol, 5 ml. of water and 2 g. of potassium hydroxide. The reaction mixture is concentrated to about 10 ml., then poured into a mixture of ice and water; the crystalline material is filtered off and dissolved in ethanol containing a few drops of concentrated hydrochloric acid. The solution is evaporated to dryness under reduced pressure and the residue is recrystallized from ethanol to yield 0.43 g. of 20α-amino-3β-hydroxy-5-allopregnane 3-α-D-glucoside hydrochloride, M.P. 259–260° (with decomposition).

*Example 4*

A mixture of 2 g. of 3β-hydroxy-20β-trifluoroacetylamino-5-allopregnane, 4 g. of acetobromglucose, 4 g. of calcium sulfate and 4 g. of silver oxide when reacted according to the procedure described in Example 1 yields the 3β-hydroxy-20β-trifluoroacetylamino-5-allopregnane 3-β-D-tetra-O-acetyl-glucoside, which is recrystallized from ethanol, M.P. 217–218.5° (yield: 1.95 g.). When hydrolized according to the procedure of Example 1, this glucoside yields the desired 3β-hydroxy-20β-amino-5-allopregnane 3-β-D-glucoside, characterized as the hydrochloride, M.P. 240–241° (with decomposition).

The starting material may be prepared as follows: A solution of 13.4 g. of 3β-hydroxy-20-oximino-5-allopregnane (prepared from 3β-hydroxy-20-oxo-5-allopregnane, by treatment of a solution of the latter in pyridine with hydroxylamine hydrochloride) in 750 ml. of dry n-propanol is refluxed while 25 g. of sodium is added in portions over a period of forty-five minutes. Refluxing is continued until all the sodium is dissolved. The solution is concentrated under reduced pressure to a volume of 350 ml., then diluted with 3000 ml. of cold water. The white crystalline material is filtered off, washed with water and recrystallized from methanol to yield 8.5 g. of 20β-amino-3β-hydroxy-5-allopregnane.

Upon treatment with trifluoroacetic acid anhydride and partial hydrolysis as shown in Example 1, the desired 3β-hydroxy-20β-trifluoroacetylamino - 5 - allopregnane, M.P. 203°.

*Example 5*

A solution of 0.175 g. of 20α-amino-3β-hydroxy-5-allopregnane 3-β-D-glucoside in 35 ml. of hot ethanol is treated with 0.033 ml. of an ethanol solution containing 0.175 g. of tartaric acid. The precipitate is collected and the 20α-amino-3β-hydroxy-5-allopregnane 3-β-D-glucoside tartrate is recrystallized from ethanol, M.P. 255–257° (with decomposition); yield: 0.12 g.

Additional 20-amino-3-hydroxy-5-allopregnane 3-glycosides which may be prepared according to the above-described procedure by choosing the appropriate reactants or reaction conditions, are, for example, 20α-amino-3β-hydroxy-5-allopregnane 3-arabinoside, 20α-amino-3β-hydroxy-5-allopregnane 3-riboside, 20α-amino-3β-hydroxy-5-allopregnane 3-α-D-glucoside, 20α-amino-3β-hydroxy-5-allopregnane 3-galactoside, 20α-amino-3β-hydroxy-5-allopregnane 3-mannoside, 20α-amino-3β-hydroxy-5-allopregnane 3-rhamnoside, 20α-amino-3β-hydroxy-5-allopregnane 3-maltoside, 20β-amino-3β-hydroxy-5-allopregnane 3-arabinoside, 20β-amino-3β-hydroxy-5-allopregnane 3-riboside, 20β-amino-3β-hydroxy - 5 - allopregnane 3-α-D-glucoside, 20β-amino-3β-hydroxy-5-allopregnane 3-mannoside, 20β-amino-3β-hydroxy-5-allopregnane 3 - galactoside, 20β-amino-3β-hydroxy-5-allopregnane 3 - rhamnoside, 20β-amino-3β-hydroxy-5-allopregnane 3-maltoside, 20α-amino-3β,21-dihydroxy-5-allopregnane 3-β-D-glucoside, 20β-amino-3β,21-dihydroxy - 5 - allopregnane 3-α-D-glucoside, 20α-amino-3β-hydroxy-19-nor-5-allopregnane 3-β-D-glucoside, 20β-amino-3β-hydroxy-19-nor-5-allopregnane 3-β-D-glucoside, 20α-amino-3α-hydroxy-5-allopregnane 3-β-D-glucoside, and the like.

The new glycosides of this invention may also be prepared by reducing in Δ5-pregnene compounds of the formula:

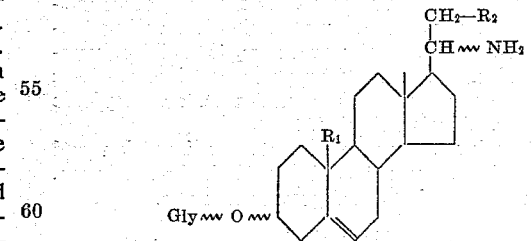

in which $R_1$, $R_2$ and Gly have the above-given meaning, or a salt thereof, the double bond in the 5,6-position, and, if desired, carrying out the optional steps.

The starting materials used in this procedure and their preparation are described in our copending patent application Serial No. 831,727, filed concurrently herewith.

The reduction is being carried out according to known methods; for example, treatment of the starting material with hydrogen in the presence of a catalyst containing a metal of the eighth group of the periodic system, e.g. platinum oxide, and in a solvent, such as a lower alkanoic acid, e.g. acetic acid, results in the removal of the double bond.

The reduction of the double bond in the 5,6-position may also be carried out simultaneously with the previously described reductive conversion of a 20-oximino group into a 20-amino group. Thus, a Δ⁵-3-hydroxy-20-oximino-pregnane 3-glycoside or a salt thereof, when treated with hydrogen in the presence of a catalyst, may yield directly the desired 3-hydroxy-20-amino-5-allopregnane 3-glycoside. For example, the treatment of an acetic acid solution of Δ⁵-3β-hydroxy-20-oximino-pregnene 3-β-D-glucoside with hydrogen in the presence of a catalyst containing a metal of the eighth group of the periodic system, e.g. platinum oxide, may yield the desired 20α-amino-3β-hydroxy-5-allopregnane 3-β-D-glucoside.

Free hydroxyl groups in the final products may be acylated according to known methods, for example, by treatment with an acid anhydride or an acid halide, e.g. chloride or bromide, in the presence of an acid neutralizing agent. The free amino group may be temporarily protected by an easily removable group, for example, the trifluoroacetyl group, which may be removed by mild hydrolysis.

This is a continuation-in-part of our application Serial No. 757,123, filed August 25, 1958, and now abandoned.

What is claimed is:

1. A member of the group consisting of 3-glycosides of 20-amino-3-hydroxy-5-allopregnane compounds of the formula:

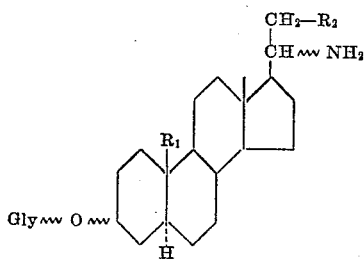

in which $R_1$ represents a member of the group consisting of hydrogen and methyl, $R_2$ stands for a member of the group consisting of hydrogen, hydroxyl and hydroxyl esterified with an organic carboxylic acid containing from one to twelve carbon atoms, and Gly represents the radical of a member of the group consisting of monosaccharides and disaccharides, and the salts of such compounds.

2. 3-glycosides of 20α-amino-3β-hydroxy-5-allopregnane with monosaccharides.

3. 3-glycosides of 20α-amino-3β-hydroxy-5-allopregnane with aldohexoses.

4. Compounds according to claim 3, wherein D-glucose represents the aldohexose.

5. 20α-amino-3β-hydroxy-allopregnane 3-β-D-glucoside.

6. 20α-amino-3β-hydroxy-5-allopregnane 3-α-D-glucoside.

7. 20α-amino-3β-hydroxy-5-allopregnane 3-lactoside.

8. 3-glycosides of 20β-amino-3β-hydroxy-5-allopregnane with monosaccharides.

9. 3-glycosides of 20α-amino-3β-hydroxy-5-allopregnane with aldohexoses.

10. Compounds according to claim 8, wherein D-glucose represents the aldohexose.

11. 20α-amino-3β-hydroxy-5-allopregnane 3-β-D-glucoside.

References Cited in the file of this patent

UNITED STATES PATENTS

| | | |
|---|---|---|
| 2,270,379 | Miescher | Jan. 20, 1942 |
| 2,455,214 | Bennekou | Nov. 30, 1948 |

OTHER REFERENCES

Gaunt et al.: Endocrinology, vol. 54 (1954), pages 272–283.

Korte et al.: Naturforsch, vol. 10B (1955), pages 499–503.